(12) United States Patent
Steiger et al.

(10) Patent No.: US 7,824,617 B2
(45) Date of Patent: Nov. 2, 2010

(54) ASSEMBLY COMPRISING J AGGREGATES

(75) Inventors: Rolf Steiger, Le Mouret (CH); Raphaël Pugin, Auvernier (CH)

(73) Assignee: CSEM Centre Suisse d'Electronique et de Microtechnique SA-Recherche et Development, Neuchatel (CH)

( * ) Notice: Subject to any disclaimer, the term of this patent is extended or adjusted under 35 U.S.C. 154(b) by 313 days.

(21) Appl. No.: 12/197,377

(22) Filed: Aug. 25, 2008

(65) Prior Publication Data

US 2009/0142230 A1  Jun. 4, 2009

(30) Foreign Application Priority Data

Aug. 23, 2007  (EP) .................................. 07114880

(51) Int. Cl.
*G01N 21/00* (2006.01)
*B05D 3/10* (2006.01)
*B32B 5/18* (2006.01)

(52) U.S. Cl. ................... 422/68.1; 427/337; 428/320.2; 977/707; 977/778; 977/811; 977/957

(58) Field of Classification Search ................ 422/68.1; 427/337; 428/320.2; 977/707, 778, 811, 977/957

See application file for complete search history.

(56) References Cited

FOREIGN PATENT DOCUMENTS

| EP | 1 788 036 A1 | 5/2007 |
|----|--------------|--------|
| WO | 2007/057356 A2 | 5/2007 |

OTHER PUBLICATIONS

F. Nüesch et al., Merocyanine Aggregation in Mesoporous Networks, 118 J. Am. Chem. Soc. 5420-5431 (1996).*
E. Arunkumar et al., Improving the Properties of Organic Dyes by Molecular Encapsulation, 19 Eur. J. Org. Chem. 4051-4059 (2005).*
J. P. K. Reynhardt et al., Polyamidoamine Dendrimers Prepared Inside the Channels of Pore-Expanded Periodic Mesoporous Silica, 15 Adv. Func. Mater. 1641-1646 (2005).*
E. Aznar et al., Photochemical and Chemical Two-Channel Control of Functional Nanogated Hybrid Architectures, 19 Adv. Mater. 2228-2231 (2007).*
Losson, "Self-organizing properties of dendrimers and potential applications," Univ de Neuchatel, Fac. Des Science, pp. i-587 (Oct. 24, 2005).
Wells et al., "Interactions between Organized, Surface-Confined Monolayers and Vapor-Phase Probe Molecules. 10. Preparation and Properties of Chemically Sensitive Dendrimer Surfaces," J. Am. Chem. Soc., vol. 118, pp. 3988-3989 (1996).
Kuhn et al., "Chromophore Coupling Effects," pp. 1-40.
Dvornic, P.R. "PAMAMOS: The First Commercial Silicon-Containing Dendrimers and Their Applications" Journal of Polymer Science: Part A: Polymer Chemistry, vol. 44, 2755-2773 (2006).
Ederth, J. et al. "Thin porous indium tin oxide nanoparticle films: effects of annealing in vacuum and air" Appl. Phys. A 81, 1363-1368 (2005).
Shaw, D.J. (ed.) "Introduction to Colloid and Surface Chemistry" $4^{th}$ Edition, Butterworth-Heinemannn Ltd. 1994 pp. 131-136.

* cited by examiner

*Primary Examiner*—Glenn Caldarola
*Assistant Examiner*—Randy Boyer
(74) *Attorney, Agent, or Firm*—Young & Thompson

(57) ABSTRACT

The present invention relates to the realization of particular supramolecular assemblies of dyes, in particular cyanines, called J aggregates. The invention concerns an assembly made up of
  a support including a mesoporous layer whereof the pores have an average BET diameter greater than 1.5 nm,
  macromolecules with dendritic architecture functionalizing said layer, at least in its pores,
  a layer of molecules from the family of cyanines interacting with the macromolecules with dendritic architecture and organized into J aggregates.

16 Claims, 10 Drawing Sheets

US 7,824,617 B2

ASSEMBLY COMPRISING J AGGREGATES

TECHNICAL FIELD

The present invention relates to the field of nanotechnology, and more specifically concerns particular supramolecular assemblies of dyes, in particular from the family of cyanines, called J aggregates. Specifically, the invention concerns a particular assembly comprising J aggregates.

In the present document, the term cyanines will include both cyanines and merocyanines and their derivatives, as defined in the article by D. M. Sturmer which appeared in the book "Chemistry of heterocyclic compounds: special topics", volume 30, pp. 441-601, published by A. Weissberger and B. W. Rossiter, 1977 (Wiley Interscience, New York), and examples of the structure of which are provided in FIGS. 2a and 2b, 3, 10 and 11, respectively.

J aggregates are self-arrangements of cyanine molecules which form very ordered assemblies whereof the organizations are of the crystalline type. A description of J aggregates and their properties can be found in the article by H. Kuhn et al. in a book entitled "J-aggregates" by T. Kobayashi, ISBN 981-02-2737-X. Due to the nearly flawless organization of J aggregates, they have remarkable properties. Thus, it was observed that the irradiation of a two-dimensional monolayer of J aggregates leads to the formation of an exciton which is capable of spreading in all of this monolayer at a high speed, typically 2 km/s, coherently and with extremely low energy loss.

STATE OF THE ART

The astonishing properties of J aggregate were observed for the first time in the 1930s. Since then, a number of applications have been proposed experimentally, demonstrating the scope of the possibilities offered by J aggregates. For example, one can cite light harvesting systems for solar devices and sensors, components for non-linear optical systems, fast optical recording systems, etc. . . .

However, these different applications have, for the moment, remained experimental. Indeed, it is very difficult to succeed in organizing cyanine monomers such that they form flawless J aggregates and in a monolayer, reproducibly.

In patent application WO 2007/057356, the applicant described a method making it possible to produce these aggregates simply, quickly and reproducibly, enabling industrial implementation. This method proposes to deposit a monolayer of hyperbranch macromolecules on a support, this monolayer serving as a template for later deposition of a layer of cyanines, which arrange themselves in J aggregates.

The object of the present invention is new developments of the method which is the object of the abovementioned patent application.

DESCRIPTION OF THE INVENTION

Although it was thought that an important parameter which allowed cyanines to arrange themselves in J aggregates was the high degree of organization proposed by the template formed by the dendrimers, and that this organization was only possible on a planar support, new experiments have shown, quite surprisingly, that it was possible to form very high-quality J aggregates on a mesoporous support on which a layer of dendrimers or hyperbranch macromolecules had been previously adsorbed.

Thus, the object of the invention is an assembly made up of
a support comprising a mesoporous layer whereof the pores have an average BET diameter greater than 1.5 nm,
dendrimer molecules functionalizing said layer, at least in its pores,
a layer of molecules from the family of cyanines interacting with the dendrimer molecules and organized into J aggregates.

The invention also concerns a method for realizing such an assembly.

BRIEF DESCRIPTION OF THE DRAWINGS

The invention will be better understood upon reading the description which follows, done in reference to the appended drawings in which.

Figure 1:
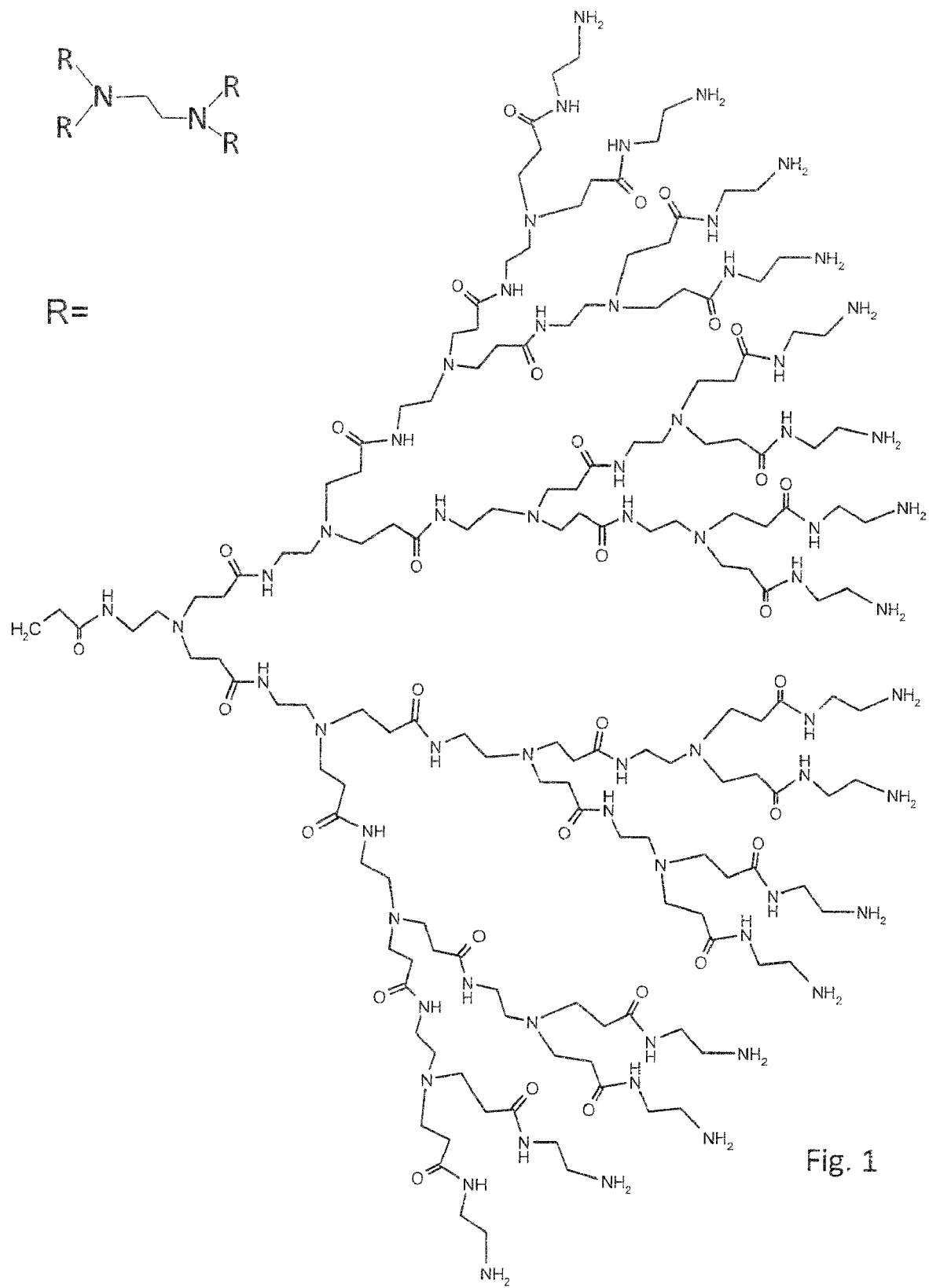
FIG. 1 illustrates the structure of a dendrimer, a fourth-generation poly(amidoamine) with ethylenediamine core, called PAMAM G4, FIGS. 2a and 2b provide an example of cyanines and merocyanines, respectively.
Figure 2A:
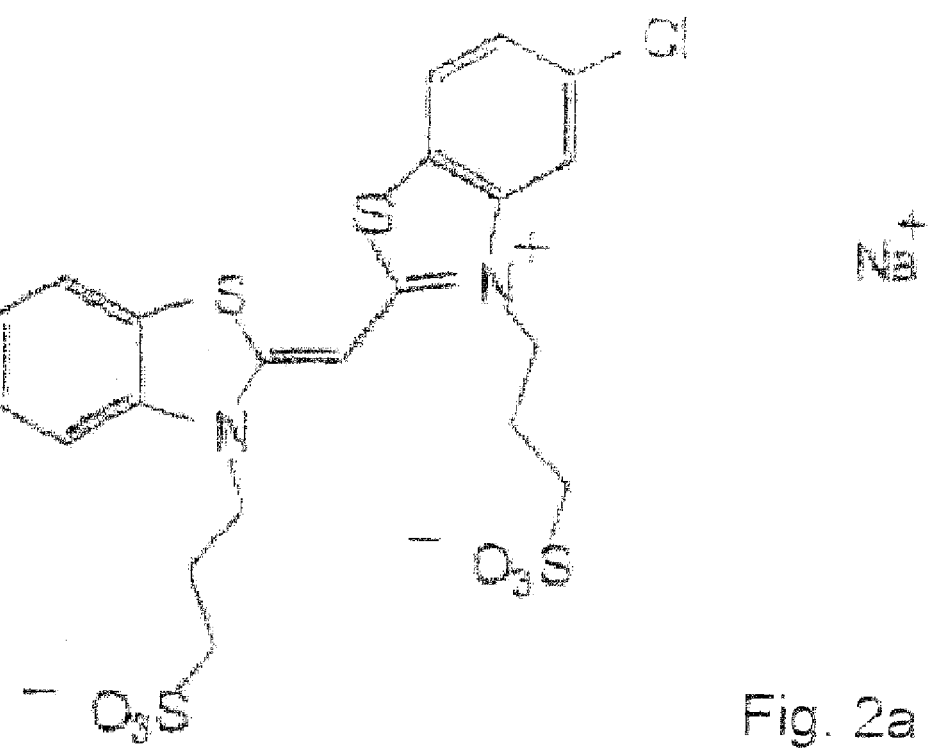
Figure 2B:
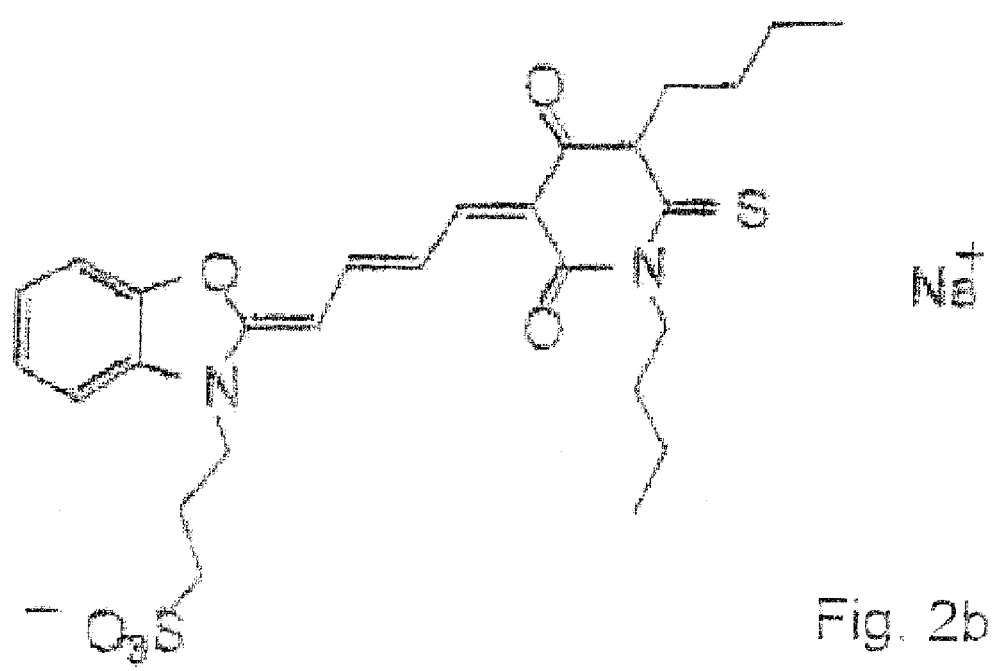

The different spectra show the absorption or emission, depending on the incident or emitted wavelength.

DETAILED DESCRIPTION OF THE INVENTION

One example of a method for producing a particular J aggregate will be described in detail below, as a non-limiting illustration of the invention. As one will understand, the method essentially consists of depositing a template on a mesoporous support, then arranging the cyanine molecules on this matrix to form the J aggregate.

Preparation of the Support

The first step consists of obtaining a mesoporous support. One may choose, for example, a nanostructured boehmite (AlOOH) based structure, or a silicon oxide based structure ($SiO_2$) or a nanostructured titanium oxide ($TiO_2$) based structure, or a mesoporous and nanoparticular indium tin oxide (ITO) based structure.

To prepare the first support mentioned above, one deposits a coating of AlOOH nanoparticles containing 11% weight of polyvinyl alcohol, on a sheet of polyester, using a bar coater. The coating is then dried and hardened at 40° C. One can refer to document U.S. Pat. No. 7,250,202 for details on the experimental conditions to be used for this operation.

To prepare the second support mentioned above, one deposits a coating of $SiO_2$ nanoparticles containing 22% weight of polyvinyl alcohol, on a sheet of polyester, using a bar coater. The coating is then dried and hardened at 40° C. This layer is then thermally treated in a water bath at 60° C. This step allows transforming Al13-oligomers produced by Aluminium Chlorohydrate used to adjust pH into Al30. Whereas Al13-oligomers are unstable, their transformation into Al30 allows strongly improving the stability of the $SiO_2$ layer after this one has been functionalized by cyanine molecules to give J aggregates. This treatment can of course be applied to any support comprising Al13-oligomers or its precursor, these species being present because the support comprises itself Aluminium or because of products used in the experiment.

To prepare the third support mentioned above, one deposits a coating of $TiO_2$ nanoparticles, for example that marketed by Degussa under reference P25, containing 4% weight of polyvinyl alcohol, on a sheet of polyester, using a bar coater. One can refer to document US 2006/0036474 for details on the experimental conditions to be used for this operation.

To prepare the fourth support mentioned above (ITO), one may refer to the document published by J. Ederle et al., Appl. Phys. A, 2005, 81(7), 1363.

As one will understand below, the average BET diameter of the pores must be greater than 1.5 nm in order to allow the dendrimer molecules to penetrate it. BET (Brunauer, Emmett and Teller, who are the inventors of this method) is the name of the analytical method used to characterize porosity through adsorption of nitrogen at low temperatures (77° K). From the porosity, it is possible to determine the volume of the pores, their average diameter, their size distribution and the specific surface of the media. For more information, one may refer to pages 131-136 of "Introduction to Colloid and Surface Chemistry", 4$^{th}$ edition, by D. J. Shaw, Ed. Butterworth-Heinemann Ltd. 1994, ISBN 0 7506 1182 0.

Advantageously, it should be noted that the support does not necessarily need specific cleaning. In some cases, in particular with an ITO support, it was, however, noted that a plasma activation step made it possible to improve the assembly of the dye molecules into J aggregates. One can refer to patent application WO 2007/057356 for details on plasma treatment of the support.

Deposition of the Template

Typically, a template is made with a dendrimer base, i.e. macromolecules each made up of monomers which join together according to a dendritic process around a multifunctional central core. The dendritic construction is done through the repetition of a same sequence of reactions until a new generation and a growing number of identical branches is obtained at the end of each reaction cycle. After several generations, the dendrimer generally assumes a spherical shape, highly branched and multifunctionalized thanks to the many terminal functions present on the periphery. The various branches create, within the very molecular structure, internal cavities close to the core. One example of a dendrimer, fourth-generation ethylenediamine-core poly(amidoamine), called PAMAM G4, is illustrated in FIG. 1.

Dendrimers have the advantage of being monodisperse and having a strictly controlled structure, geometry and stoichiometry. Indeed, the reaction diagram for their preparation being clearly defined, each of the molecules of a given dendrimer is identical to another. For one defined dendrimer molecule, the number of functions (internal and peripheral), the charge density, the occupied surface and volume, the porosity of these nanomolecules are known. The table below provides several examples of dendrimers as well as some of their characteristics (theoretical properties).

|  | Number of peripheral functions | Theoretical diameter (nm) | External surface ($nm^2$, spherical shaped model) | Surface density of the functional groups (per $nm^2$) |
| --- | --- | --- | --- | --- |
| PAMAM G0 | 4 | 1.5 | model not valid | — |
| PAMAM G1 | 8 | 2.2 | model not valid | — |
| PAMAM G4 | 64 | 4.5 | 63.6 | 1 |
| PAMAM G6 | 256 | 6.7 | 141 | 1.8 |

One can see that the diameter of the dendrimers varies according to the generation. Depending on the dendrimer, the diameter of the pores of the support must be adapted in order to allow the dendrimer molecules to penetrate them. One sees that, for PAMAM G0 type dendrimers to be able to penetrate the pores, these must have a diameter greater than 1.5 nm. Although they have few peripheral functions, these dendrimers nevertheless enable the cyanines to arrange themselves. If one wishes to use dendrimers of a higher generation, the pores will have to have an average diameter greater than 1.5 nm. However, the dendrimers have a certain deformability and as a result can penetrate pores whereof the diameter is less than their theoretical diameter. This comment is all the more valid for very deformable low-generation dendrimers. For dendrimers of higher generations, the highly-branched molecule generally adopts a spherical shape whereof the deformability and flexibility of the internal branches is progressively reduced. Thus, and as a non-limiting example, one can consider that a support whereof the pores are at least 1.5 nm, 4 nm and 6 nm can receive generation 1, 4 and 6 PAMAM, respectively. It is obviously necessary that a minimum of approximately twenty cyanine molecules also be able to penetrate inside the pores to form a J aggregate. Cyanines being much smaller (volume of one molecule approximately 0.8 $nm^3$ for MYL 1) than dendrimers, this condition is generally met with pores within which dendrimers were able to penetrate.

The dried nanocrystalline layers of AlOOH, $SiO_2$, $TiO_2$ and ITO mentioned during the preceding step are submerged, without cleaning treatment, for 18 hours in a 4$^{th}$ generation (PAMAM G4) ethanolic solution of ethylenediamine-core poly(amidoamine) with a concentration of $1.10^{-4}$ M. Thanks to the interactions between the metallic oxides contained in these layers and the many functional groups of the PAMAM, this is effectively adsorbed at the surface of the mesoporous layer, including inside the pores.

The mesoporous layer containing the dendrimer is then rinsed with pure ethanol in order to eliminate the PAMAM molecules not linked to the surface of the support. Lastly, it is dried under a nitrogen flow.

One thus obtains an assembly made up of a polyester support coated with a metallic oxide nanoparticle (AlOOH, $SiO_2$, $TiO_2$ or ITO) based mesoporous layer functionalized on the surface and within mesopores by a PAMAM G4 type dendrimeric template.

Formation of J Aggregates

Figure 3:
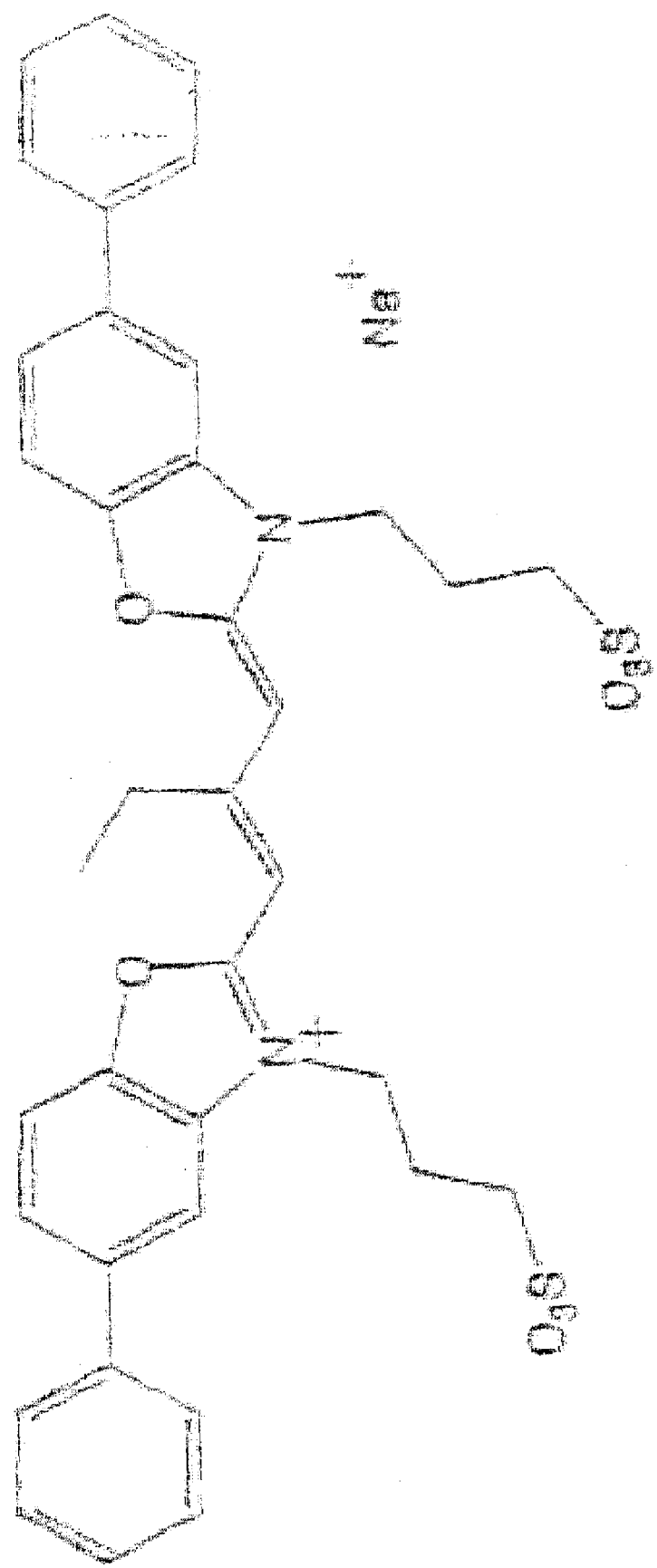
FIG. 3 shows the structure of Myline 1, FIG. 4 provides an absorption spectrum for MYLINE 1 in solution according to the concentration.

The cyanine used to form the J aggregate is [5,5'-diphenyl-dibenzoxazolo N,N'-propylsulfonate]-9 ethyl trimethine cyanine (called MYLINE 1), illustrated in FIG. 3. These cyanines being photosensitive, it is absolutely necessary to avoid exposing them to light, both during the preparation of the reagent and during the reaction. The cyanine is dissolved in acetone at a concentration of $7.10^{-4}$ M. The mixture is magnetically stirred for 2 hours to guarantee the total solubilization of the reagent.

The proposed cyanine is negatively charged. Thus, to enable it to interact with the PAMAM deposited on the support, it is possible to positively charge the latter. To do this, the support is first submerged in an acid solution, typically chlorhydric acid with a pH of 3.5 in order to protonate all of the amine functions of the PAMAM or only some of them. The support thus activated is then submerged in the above cyanine solution for a period of between several seconds and several minutes. Next, the assembly containing the J aggregate is rinsed with pure acetone and dried under a nitrogen flow.

The duration of adsorption within the functionalized mesoporous templates is longer than that which is applied to form J aggregates on planar media (see table 1). This can be explained by the fact that the time required for the cyanine molecules to scatter then self-assemble inside a mesopore plays a significant role in the speed at which the J aggregate is formed. Given the diameter and geometry of the pores, both of which participate greatly in reducing the diffusion kinetics of the cyanines; the aggregation speed of these same cyanines into J aggregate within the mesoporous template is logically smaller than on planar surfaces. Nevertheless, one can note that the adsorption times mentioned in the table for mesoporous media are perfectly compatible with continuous-type industrial methods.

Results

As shown by table 1, one obtains an assembly made up of a support, in polyester according to the example, covered with a thin layer of AlOOH, $SiO_2$, $TiO_2$ or mesoporous and nanocrystalline ITO, the mesopores of which contain one or several layers of PAMAM G4 dendrimer according to the example, and J aggregates of MYLINE 1 cyanine organized at the surface of these dendrimers.

Figure 4:
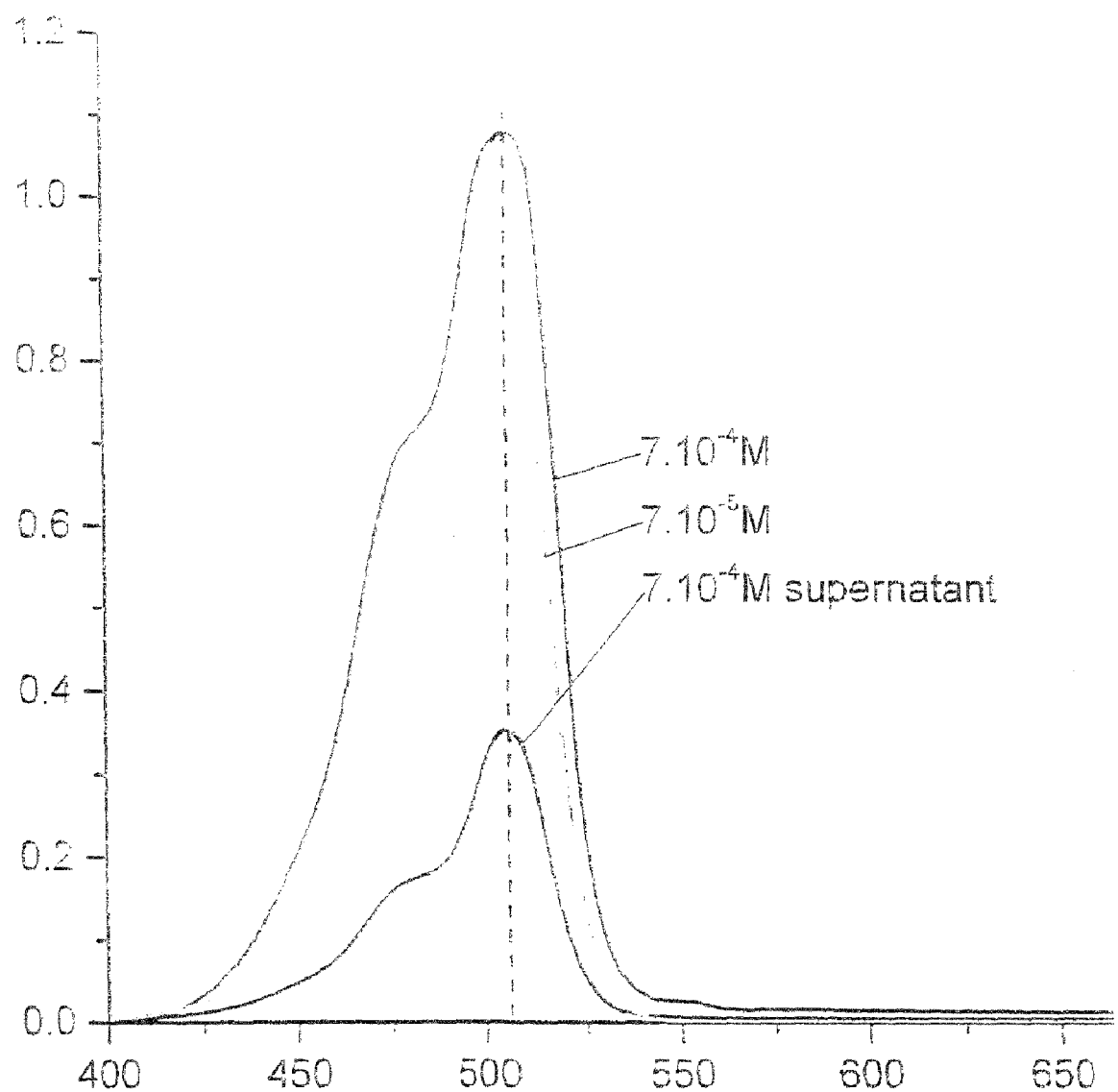

The assembly obtained above, particularly the layer of MYLINE 1, is analyzed using a UV-visible spectrophotometer. For information and comparison, the absorption spectrum of the MYLINE 1 molecule, in solution and not aggregated, is described in FIG. 4. A study of the spectrum in solution shows three peaks for the MYLINE 1 cyanine, at 479 nm, 506 nm and 551 nm, described in the literature as corresponding to absorption peaks of the dimer, monomer and a very weak maximum absorption of 551 nm corresponding to traces of the J aggregate of MYLINE 1 preformed in solution.

Figure 5:
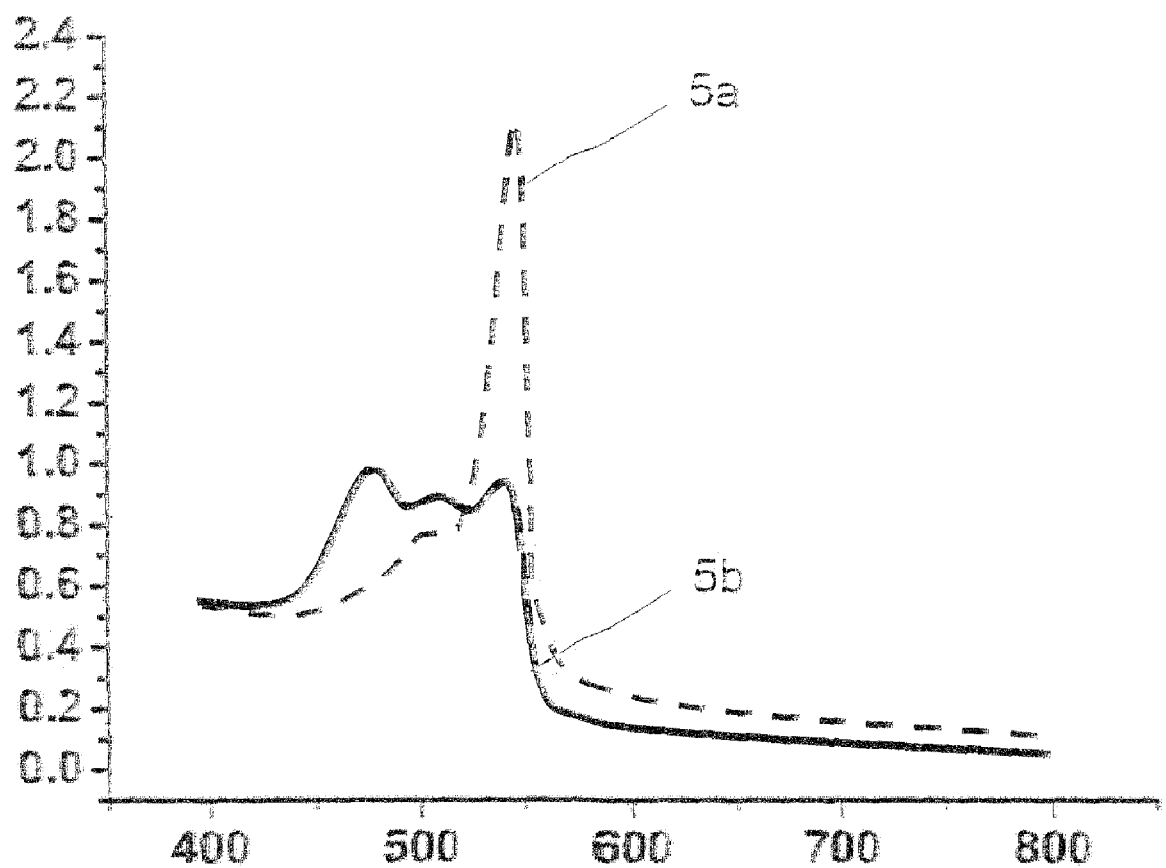
FIG. 5 illustrates the absorption spectrum for the MYLINE 1 molecule deposited on a mesoporous layer of $TiO_2$ with a thickness of 3 µm, for an adsorption time of 40 minutes, with (curve 5a) or without (curve 5b) a layer of PAMAM G4.

The spectrum obtained with MYLINE 1 (adsorption time: 40 min) on the approximately 3 μm thick nanocrystalline layer of $TiO_2$ functionalized with PAMAM G4 dendrimer, appearing in the second line of table 1, is presented in FIG. 5a. Compared to the absorption spectrum of the MYLINE 1 molecule in solution (FIG. 4) and that of MYLINE 1 deposited on a mesoporous layer of $TiO_2$ not functionalized by the PAMAM G4 dendrimer (FIG. 5, spectrum 5b), spectrum 5a demonstrates the crucial role of the PAMAM G4 layer in the controlled aggregation process of the MYLINE 1. In the presence of the PAMAM G4 layer, the formation of highly defined J aggregates is demonstrated by the presence of an absorption peak at 550 nm; without PAMAM G4, the formation of J aggregates (550 nm) is put at a disadvantage by the presence of monomers (506 nm) and dimers (479 nm).

Figure 6:
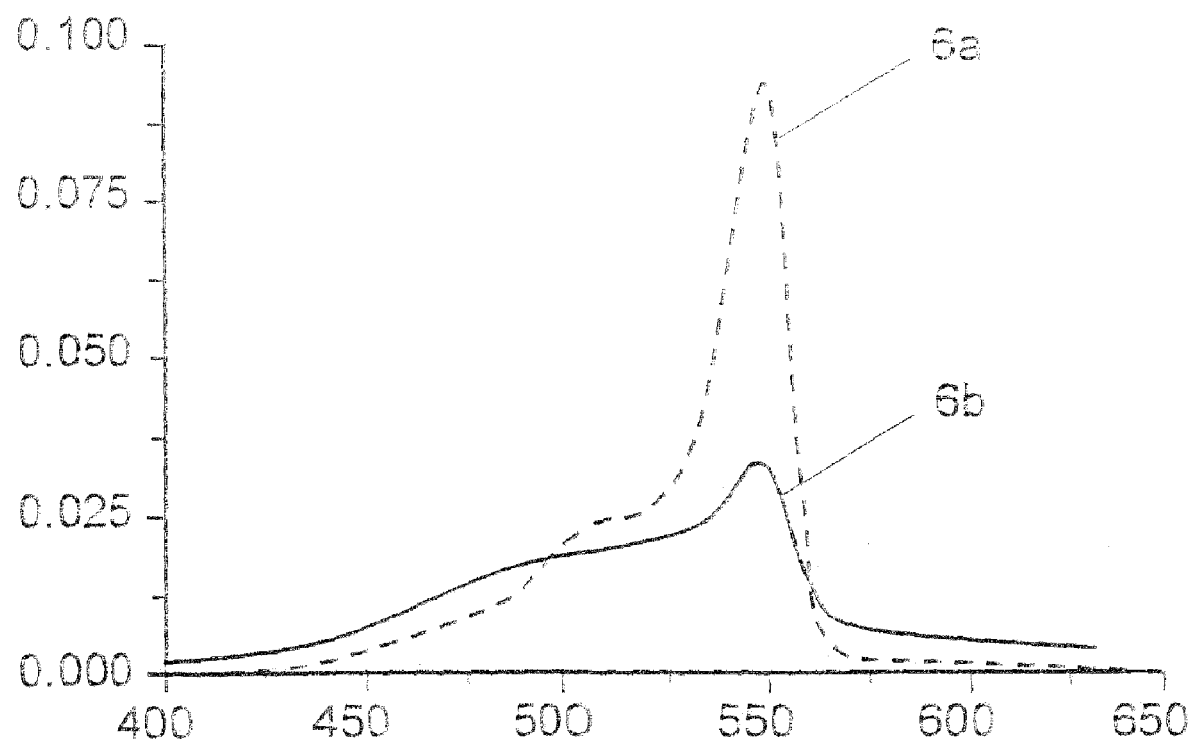
FIG. 6 shows the absorption spectra of MYLINE 1 deposited on a glass support with (curve 6a) or without (curve 6b) a layer of PAMAM G4.

To make it possible to compare the results obtained on a mesoporous support with those previously obtained on a planar substrate, one can compare the spectra of FIGS. 6 and 5. In the presence of PAMAM (spectra 5a and 6a), the wavelengths of the J aggregate peak obtained according to the above method and of reference samples obtained through the Langmuir-Blodgett technique agree remarkably, thereby demonstrating regularity and quality, i.e., the high molecular organization and the great homogeneity, of the J aggregate produced. Moreover, the high degree of molecular organization is confirmed by the J/M (J aggregate/monomer) ratio=4.8 to 5.7 (Table 1), which is even greater than the J/M ratio obtained on a planar glass support (Table 1) and which is equivalent to the highest J/M ratio obtained in the Langmuir-Blodgett layers. Likewise, the full width at half maximum of the spectrum (fwhm, Table 1) is similar to that obtained on glass media and demonstrates the high molecular organization of the J aggregates.

Figure 7:
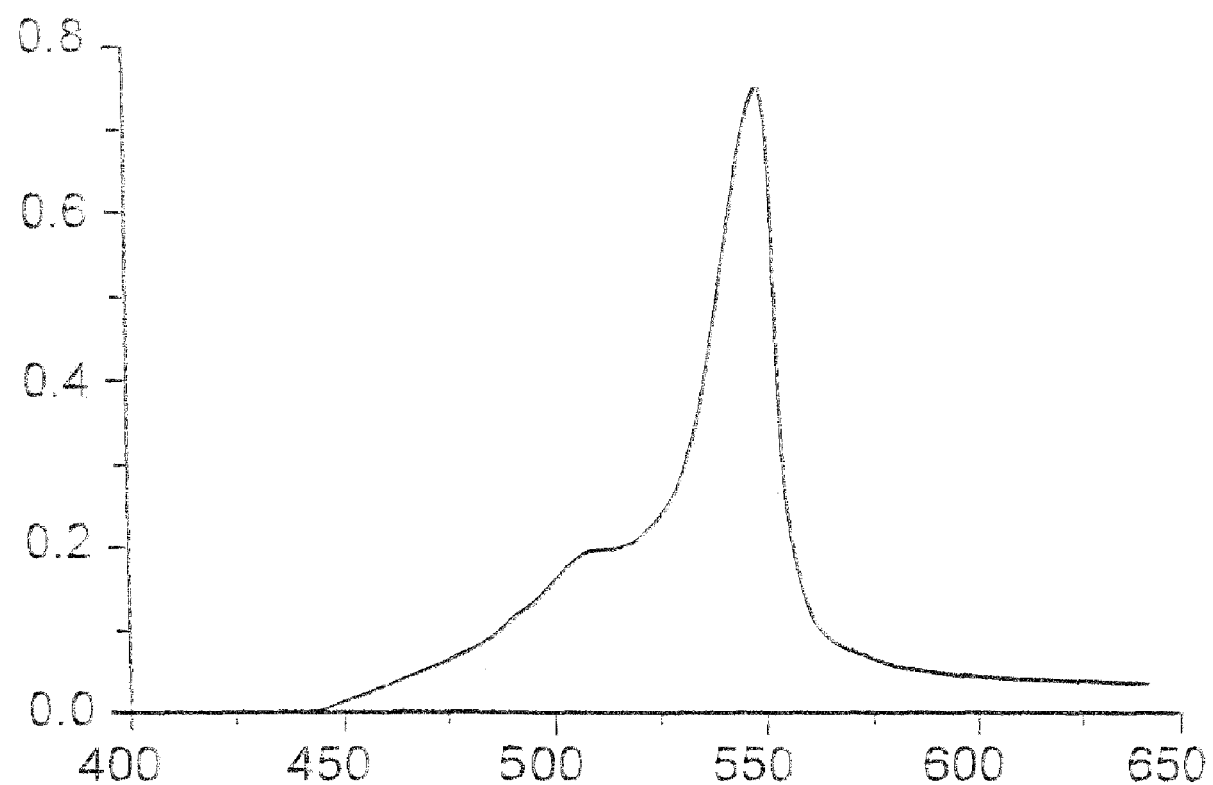
FIG. 7 is an absorption spectrum of the MYLINE 1 J aggregate on a mesoporous nanocrystalline layer of $TiO_2$ having a thickness of 3 µm and functionalized with a layer of PAMAM G4, for an adsorption time of 10 minutes.

The quality of the organization of the J aggregates formed is confirmed by comparing the fluorescence emission and absorption wavelengths of the assembly obtained above. The absorption peak appears at a wavelength of 550 nm, while the emission peak appears at 557 nm (Table 1). This small gap is explained in particular by the fact that the fluorescence spectrum on $TiO_2$ shows a low intensity due to the transfer of electrons from the J aggregate to the $TiO_2$, which also decreases the resolution in wavelengths. Nevertheless, it shows that the molecules are highly organized in J aggregates, given that these aggregates have emission spectra similar to those obtained in the layers obtained through Langmuir-Blodgett (resonance fluorescence). An even better quality of J-aggregates was able to be obtained (fwhm: 18 nm) with shorter adsorption times (10 min) on a nanocrystalline layer of $TiO_2$ with a thickness of approximately 3 μm (FIG. 7; table 1).

Figure 8:
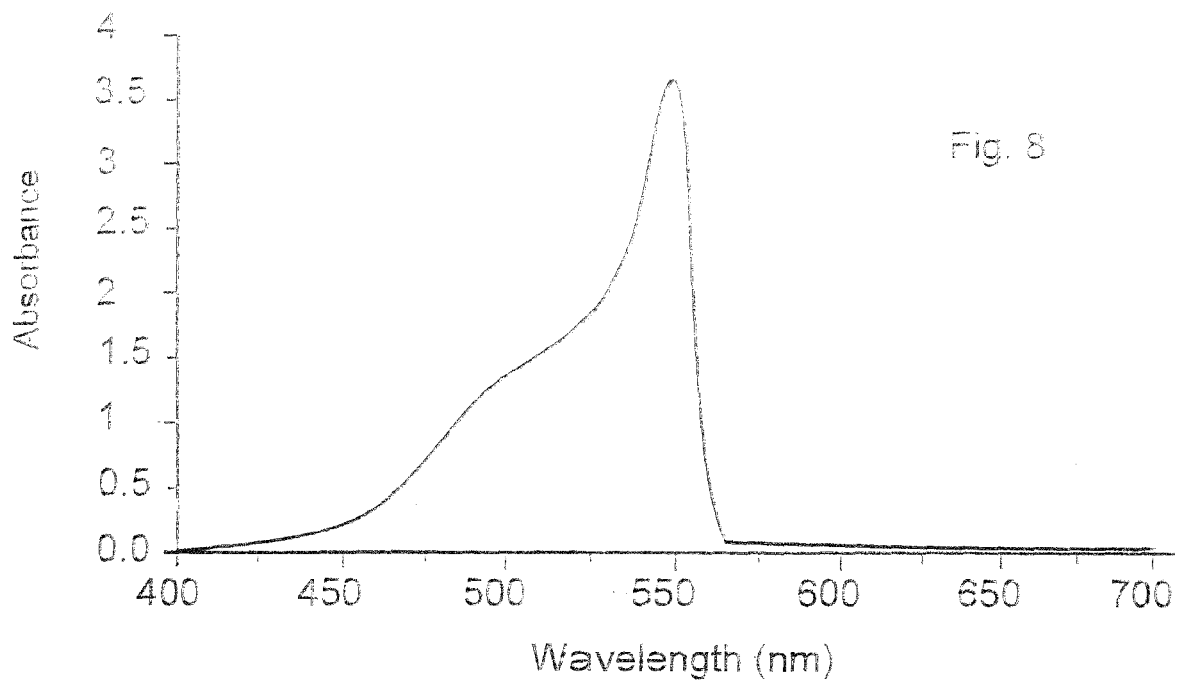
FIG. 8 is an absorption spectrum of the Myline 1 J aggregate on a mesoporous layer of AlOOH functionalized with a layer of PAMAM G4, for an adsorption time of 10 minutes.
Figure 9:
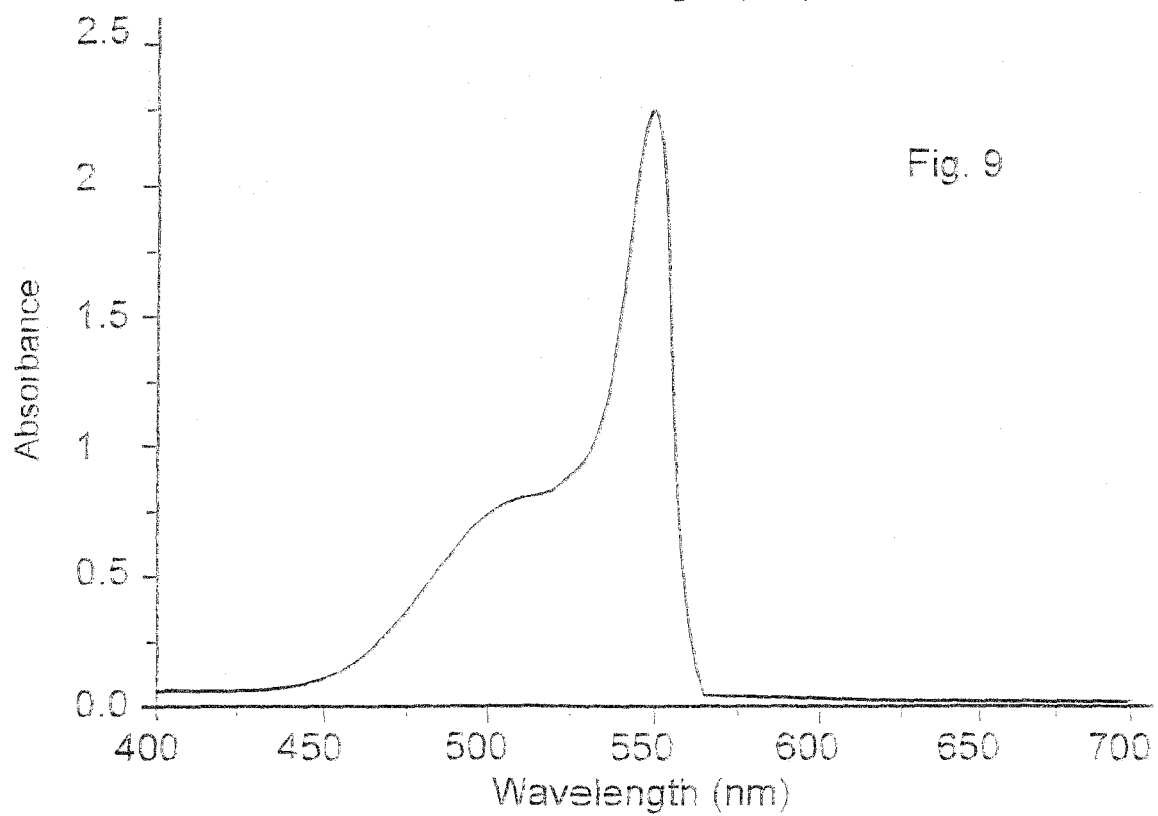
FIG. 9 is an absorption spectrum of the Myline 1 J aggregate on a mesoporous layer of $SiO_2$ functionalized with a layer of PAMAM G4, for an adsorption time of 10 minutes.

Spectra obtained with Myline 1 on mesoporous layers of AlOOH and $SiO_2$ functionalized with PAMAM G4 dendrimer (third and fourth lines of table 1) are shown in FIGS. 8 and 9 respectively.

Compared to the absorbance of a monolayer of J aggregates obtained on the different planar media tested (glass, gold, $Ta_2O_5$, examples provided in application WO 2007/057356), the absorbance of the J aggregates formed on layers of mesoporous metallic oxides is much higher. As illustrated in table 1, depending on the nature, thickness of the mesoporous layer and adsorption time, the absorbances go from 0.7 to 3.5 (up to more than 30 times greater than the absorbance observed on planar media, spectrum 5a compared to spectrum 6a). These very high absorbance values are related to the significance of the internal specific surface of the mesoporous metallic oxide layers, which enables the formation of J aggregates on the external surface of this layer but also within the mesopores whereof the walls have been previously decorated with a layer of PAMAM.

One important parameter, which indicates that J aggregates deposited on mesoporous media can be applied industrially, is the stability over time of the aggregates formed. One observes that, in the absence of light, the J aggregates obtained on mesoporous media remain remarkably organized, and even that the intensity of the peaks increases slightly. One may think that this effect is due to the elimination of traces of solvent still present just after the reaction. On the different layers described above, the stability in the absence of light is equivalent.

Variations of the Support

The examples above propose four types of mesoporous layers, used as a support to receive a layer of dendrimers. Other mesoporous metallic oxides can be considered, such as $\gamma$-$Al_2O_3$, $ZrO_2$, $Ta_2O_5$. Moreover, TCO (transparent conductor oxide) type nanoparticles, such as doped $SnO_2$ and ZnO, can also be used. In all cases, the diameter of the pores need only be large enough to allow the dendrimer molecules and at least 20 cyanine molecules to penetrate them. The support must also have sufficient interactions with the dendrimers for these to adsorb to its surface.

The term "adsorption" must be interpreted broadly here. Indeed, there are several types of adsorption. Physical adsorption, or physisorption, uses weak bonds, of the Van der Waals force type. In other cases, adsorption uses significant binding energy. One then talks of chemical adsorption, or chemisorption. The forces called into play are of the same type as those which are involved during the formation of chemical bonds. Both types of interaction between the dendrimers and the support are possible.

Moreover, the possibility of covalently binding the dendrimers on the support must be noted. The covalent bond may be formed directly between the peripheral groups of the dendrimer and the reactive sites of the support and/or via cross-linking reactions between the dendrimer molecules. One example of this kind of attachment is, for example, the covalent attachment of poly(amidoamine)-organosilicone (PAMAMOS) type dendrimers on glass described in the article by P. R. Dvornic, Journal of Polymer Science, 2006, 44, 2255-2273. The covalent attachment of the dendrimer can also be done through the use of an intermediate attaching layer between the support and the layer of dendrimers. One example of such an intermediate layer can be found in the article by M. Wells et R. M. Crooks, J. Am. Chem. Soc. 1996, 118, 3988-3989.

The different possibilities for adsorption and covalent attachment of the dendrimers make it possible to functionalize the mesoporous layers, in the sense that they allow the cyanines deposited later to arrange themselves into J aggregates.

Variations in the Template

Various types of PAMAM can be used, whether positively or negatively charged. Other dendrimers, such as PAMAM G3.5, G4.5, . . . , Gm.5, . . . with carboxylic (COOH) or carboxylate (COO$^-$) peripheral functions also form templates allowing cyanines to arrange themselves into J aggregates. The essential characteristic which must be found in the molecule forming the template is that its external surface, i.e. that forming the interface with the reactive environment when it is on the support, must be defined and regular. It most also have a high density of peripheral functional groups to interact effectively with the support in order to be adsorbed there or bound covalently, but also to interact with dyes molecules and participate in their self-assembly into J aggregates. The quality of the self-assembly and the resulting J aggregate will depend on the nature and the density of the functional groups within the architecture of the dendrimer, and on the type of functional group/dyes interaction.

One skilled in the art will be able to perform the necessary experiments to broadly test macromolecules with dendritic architecture, including dendrimers, but also hyperbranch polymers. Let us specify that hyperbranch polymers, the molecular architecture of which is more irregular, are obtained through polymerization of ABn multifunctional branched monomers using a non-iterative method. While dendrimers are generally of limited size and monodisperse (through the synthesis methods and steric congestion phenomena), hyperbranch polymers are generally more polydisperse. However, such hyperbranch polymers can also be suitable for the self-assembly of dye into J aggregates insofar as one part of the functional groups enables the adsorption or covalent attachment of this molecule on the support, while another part of the hyperbranch structure of the polymer interacts with the molecules of dyes and participates in their self-assembly.

As with the different dendrimers considered, the quality of the self-assembly and the resulting J aggregate will depend on the nature and density of the functional groups within the architecture of the hyperbranch polymer, and on the type of functional group/dye interaction. Moreover, the size of the hyperbranch polymer must also allow its incorporation within the mesoporous structure of the support. Primary members of the family of macromolecules with dendritic architecture, hyperbranch polymers are then considered to be included when the term "dendrimer" is used in the framework of the present invention.

Variations in the Cyanines

The different dyes included in the definition of the family of cyanines provided above, i.e. cyanines, merocyanines and their derivatives, are likely to arrange themselves to form J aggregates on a template as defined in the preceding paragraphs. Of course, cyanine and the molecule forming the template must be chosen one according to the other so that the cyanine interacts with the functional groups present at the periphery of the template, which involves, for example, a complementarity of electrical charges and a similarity of charge densities.

Figure 10:
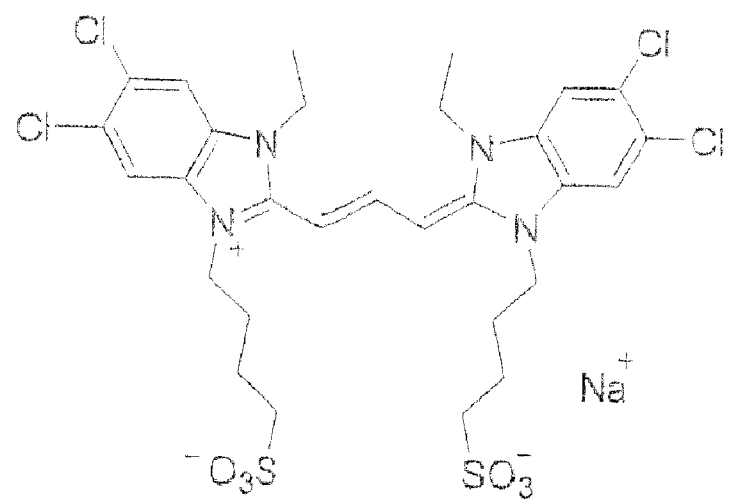
FIG. 10 shows the structure of the Myline 2.

The possibility of extending the process of aggregation on a mesoporous support previously functionalized by a layer of dendrimers or of hyperbranch macromolecules to other cyanines has been demonstrated. Indeed, 5,5',6,6'-tetrachloro-(2,2'-di-butylsulfonate, 9,9'-diethyle) benzimidazolo trimethine cyanine (Na$^+$ counter-ion), called Myline 2 and illustrated in FIG. 10, can be deposited and organized on a template in PAMAM G4, previously deposited on a mesoporous layer of $TiO_2$ (with a thickness of approximately 3 µm).

Myline 2 was used in anion-active form, in solution in acetone at $7.10^{-4}$ M. The PAMAM having protonated, as described above, the template is submerged from 10 to 60 minutes in the Myline 2 solution and rinsed in acetone. The formation of J aggregates was observed, confirmed by the presence of an absorption peak at 583 nm. If one compares the absorbance of Myline 2 J aggregates formed on the mesoporous layers of $TiO_2$ to the absorbance of a monolayer of J aggregates obtained on a planar layer of gold (see the aforementioned patent application WO 2007/057356), this is higher (approximately 0.27 for an immersion time of 10 minutes on mesoporous $TiO_2$ whereas a maximum absorbance of 0.09 is observed on planar gold support). These high absorbance values are connected to the significance of the internal specific surface of the layers of mesoporous $TiO_2$, which enables the formation of J aggregates on the external surface of this layer but also within the mesopores, the walls of which have been previously decorated with a layer of PAMAM. Concerning the full width at half maximum of the spectrum obtained on the mesoporous $TiO_2$ layers, the latter is similar to that obtained on planar gold media (fwhm=20 nm) and demonstrates the high molecular organization of the J aggregates of Myline 2 on the layers of mesoporous $TiO_2$.

Figure 11:
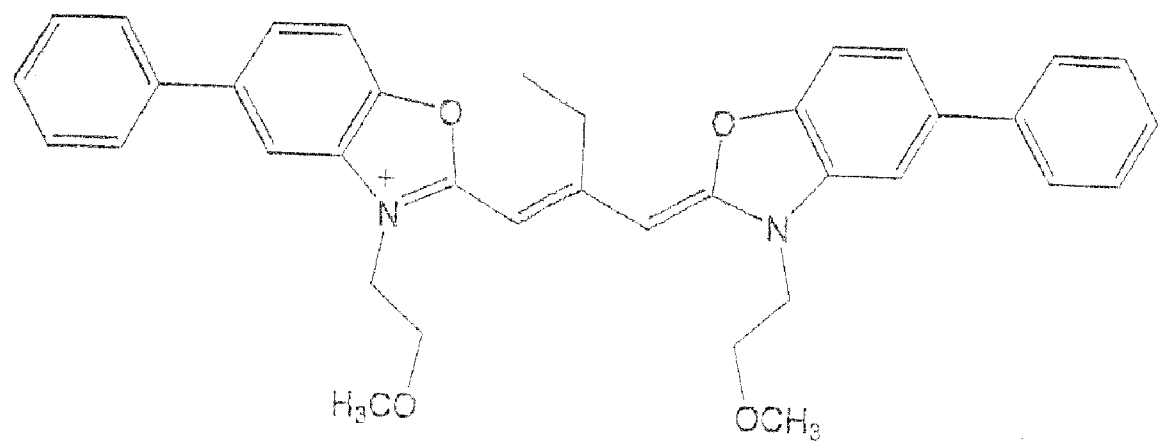
FIG. 11 shows the structure of a cationic cyanine.

Similarly, a cation-type cyanine can also arrange itself to form J aggregates on a negatively charged template. An example of one such cyanine is illustrated in FIG. 11, while a negatively charged dendrimer can, for example, be a Gm.5 generation PAMAM with carboxylate peripheral functions. In this case, the method described above may comprise a step consisting of negatively charging the dendrimer molecules of the layer arranged on the support. For example, this step can consist of deprotonating the dendrimer molecules through a reaction in a basic environment.

Other types of weak interactions, such as Van der Walls interactions or hydrogen bonds, for example, can also ensure the self-assembly of cyanines into J aggregates on a dendrimer template. These interactions or bonds between cyanines and dendrimers guarantee sufficient interactions with the dendrimer template while also ensuring that the cyanines have the mobility necessary for their self-assembly and the formation of high-quality J aggregates.

Thus is proposed a particularly simple method, making it possible to obtain very high-quality and very stable J aggregates able to be implemented in industrial applications. In particular, the J aggregates realized according to the invention within mesoporous templates can be used directly as light harvesting systems for solar devices and sensors, for interfaces for the detection of electron acceptor molecules (by measuring the reduction of the fluorescence emission of the J aggregates, see example hereafter).

The techniques described above open broad perspectives in terms of experimentation, to apply them to other macromolecules with dendritic architecture and hyperbranch polymers, to other mesoporous substrates or other types of dyes. One skilled in the art will then be able to plan and carry out the necessary experiments to broadly test the different mesoporous support/dendritic macromolecule/dye combinations likely to form J aggregates. The scope of the invention is therefore not limited to the chemical types mentioned in the specific examples.

Application to the Detection of Electron Acceptor Molecules

In patent application WO 2007/057356, the applicant described that the presence of an electron acceptor molecule (the 1,1'-diméthyé-4,4'bipyridinium, also known as paraquat for a use as a powerful herbicide) may be detected by reduction of the fluorescence emission of J aggregates self-arranged on a planar support.

In the present invention, some recent experiments showed that this kind of detection could also be conducted on mesoporous support. It was surprising to observe that the solution to be tested diffuses into the pores and that the paraquat was able to catch electrons inside the pores.

Figure 12:
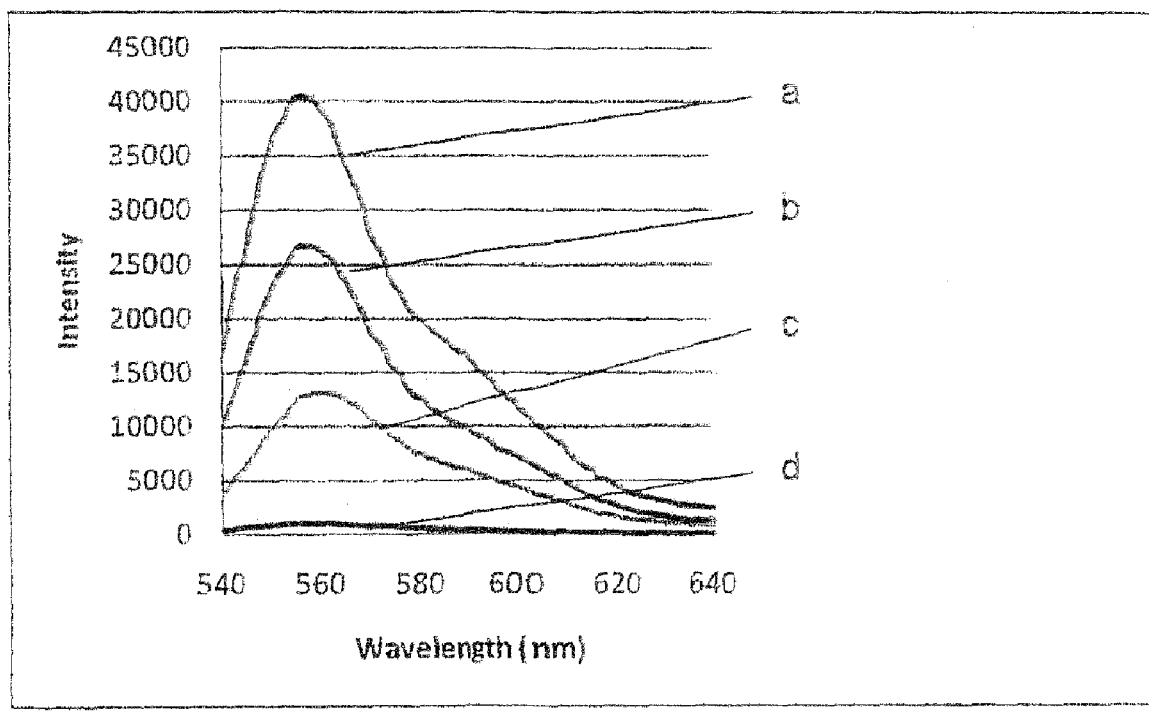
FIG. 12 shows a spectrum comprising fluorescence emission of Myline 1 J aggregates self-organized on mesoporous supports of $SiO_2$, after the latter have been put into contact with paraquat solutions of variable concentrations.

To perform these experiments, some Myline 1 J aggregates are prepared according to the method described above, on mesopourous support of $SiO_2$ covered with a template matrix of PAMAM G4. The obtained assembly is then immersed for 10 minutes in aqueous solutions of paraquat, at different concentrations. Next, mesoporous supports comprising J aggregates exposed to paraquat are excited with a 500 nm wavelength source and the fluorescence emission spectra illustrated in FIG. 12 are obtained. They show the emission intensity depending on the wavelength, for:
  a: a reference sample which has not been in contact with paraquat,
  b: a sample having been soaked in a $1.10^{-6}M$ paraquat solution,
  c: a sample having been soaked in a $1.10^{-3}M$ paraquat solution, and
  d: a sample having been soaked in a $1.10^{-2}M$ paraquat solution.

Thus, these results demonstrate as a non limiting example, that the presence of an electron acceptor molecule may be effectively and reproducibly detected by reduction of the fluorescence emission of J aggregates self-arranged on a mesoporous support. One skilled in the art will be able, according to the methods above mentioned, to conduct experiments allowing to assess broadly the ability of such mesoporous supports comprising self-organized J aggregates to detect other electron acceptor molecules, like explosive for example.

The invention claimed is:

1. An assembly made up of
    a support comprising a mesoporous layer whereof the pores have an average BET diameter dimensioned so as to allow macromolecules with dendritic architecture to penetrate them,
    macromolecules with dendritic architecture functionalizing said layer, at least in its pores,
    a layer of molecules from the family of cyanines interacting with the macromolecules with dendritic architecture and organized into J aggregates.

2. The assembly of claim 1, wherein said macromolecule with dendritic architecture is a dendrimer molecule.

3. The assembly of claim 2, wherein said layer is realized in a material chosen among AlOOH, $TiO_2$, ITO, $SiO_2$, $\gamma$-$Al_2O_3$, $ZrO_2$, $SnO_2$, ZnO, $Ta_2O_5$, or with a base of doped conductor oxide nanoparticles.

4. The assembly of claim 1, wherein the average BET diameter of the pores of the mesoporous layer is greater than 1.5 nm.

5. The assembly of claim 2, wherein the average BET diameter of the pores of the mesoporous layer is greater than 1.5 nm.

6. A method for producing an assembly according to claim 1, comprising the following steps:
    i. obtaining a support comprising a mesoporous layer whereof the pores have an average BET diameter dimensioned so as to allow macromolecules with dendritic architecture to penetrate them,
    ii. depositing a solution of macromolecules with dendritic architecture on the support likely to penetrate inside the pores of the support, so as to be able to functionalize the pores,
    iii. recovering the obtained assembly with a solution of cyanines reacting with said macromolecules with dendritic architecture to arrange themselves into J aggregates.

7. The method of claim 6, wherein the support comprises $Al_{13}$-oligomers or its precursor and wherein said method comprises between steps i and ii a thermal treatment of the support to transform $Al_{13}$-oligomers into $Al_{30}$.

8. The method of claim 6 wherein it comprises, before step iii, an additional step consisting of positively charging the macromolecules with dendritic architecture of the layer arranged on the support.

9. The method of claim 8, wherein said additional step consists of protonating the macromolecules with dendritic architecture through a reaction in an acid environment.

10. The method of claim 6, wherein it comprises, before step iii, an additional step consisting of negatively charging the macromolecules with dendritic architecture of the layer arranged on the support.

11. The method of claim 10, wherein said additional step consists of deprotonating the macromolecules with dendritic architecture through a reaction in a basic environment.

12. The method of claim 6, wherein it comprises, after step ii, a rinsing step to eliminate the macromolecules with dendritic architecture not having adhered to the support.

13. The method of claim 6, wherein it comprises, after step iii, a rinsing step to eliminate the cyanines not having reacted with the macromolecules with dendritic architecture.

14. The method of claim 6, wherein said mesoporous layer is realized with a base of a material chosen among AlOOH, $TiO_2$, ITO, $SiO_2$, $\gamma$-$Al_2O_3$, $ZrO_2$, $SnO_2$, ZnO, $Ta_2O_5$, or with a base of doped transparent conductor oxide nanoparticles.

15. The method of claim 6, wherein said macromolecules with dendritic architecture are poly(amidoamine) (PAMAM), advantageously from generation 1 to 10, preferably from generation 4 to 10.

16. Sensor for detecting the presence of an electron acceptor molecule comprising the assembly according to claim 1.

* * * * *